United States Patent
Ko

(10) Patent No.: US 9,240,081 B2
(45) Date of Patent: Jan. 19, 2016

(54) SYSTEM AND METHOD OF PROVIDING VEHICULAR TELEMATICS SERVICE

(71) Applicant: Hyundai Motor Company, Seoul (KR)

(72) Inventor: Jae Yoon Ko, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/470,546

(22) Filed: Aug. 27, 2014

(65) Prior Publication Data

US 2015/0170432 A1 Jun. 18, 2015

(30) Foreign Application Priority Data

Dec. 13, 2013 (KR) .......................... 10-2013-0155844

(51) Int. Cl.
*G07C 5/00* (2006.01)
*H04W 4/12* (2009.01)

(52) U.S. Cl.
CPC ........ *G07C 5/008* (2013.01); *H04W 4/12* (2013.01)

(58) Field of Classification Search
CPC ................. G07C 5/008; H04W 4/12
See application file for complete search history.

(56) References Cited

U.S. PATENT DOCUMENTS

| 7,623,949 | B2* | 11/2009 | Nou .............................. 701/31.4 |
| 7,925,255 | B2* | 4/2011 | Habermas et al. ............ 455/428 |
| 2012/0252364 | A1* | 10/2012 | Inabathuni et al. .......... 455/41.2 |
| 2013/0090139 | A1* | 4/2013 | McHenry et al. ............. 455/466 |

FOREIGN PATENT DOCUMENTS

| KR | 10-2006-0062641 A | 6/2006 |
| KR | 10-2010-0077971 A | 7/2010 |
| KR | 10-2012-0089125 A | 8/2012 |

* cited by examiner

*Primary Examiner* — Michael J Zanelli
(74) *Attorney, Agent, or Firm* — McDermott Will & Emery LLP

(57) ABSTRACT

A system and a method is provided for providing vehicular telematics service. The system for providing a vehicular telematics service includes a vehicle terminal, in which an embedded application and a downloaded application are installed for receiving a telematics service. The vehicle terminal also includes a telematics unit for transceiving data for the telematics service through a wireless communication network. The system further includes a telematics center which applies sending information and reception information about a service target application to header information of a service request message when receiving a service request from a user terminal. The telematics center further transmits the service request message to the vehicle terminal, in which when the vehicle terminal receives the service request message, the vehicle terminal drives the embedded application or the downloaded application by referring to the reception information applied to the header information.

14 Claims, 3 Drawing Sheets

SYSTEM AND METHOD OF PROVIDING VEHICULAR TELEMATICS SERVICE

CROSS-REFERENCE TO RELATED APPLICATION

This application claims priority to and the benefit of Korean Patent Application No. 10-2013-0155844 filed with the Korean Intellectual Property Office on Dec. 13, 2013, the entire contents of which are incorporated herein by reference.

TECHNICAL FIELD

The present disclosure relates to system and method for providing a vehicular telematics service, and more particularly, to system and method for providing a vehicular telematics service capable of discriminating an application.

BACKGROUND

In general, a telematics terminal is a vehicle terminal, which is mounted in a vehicle to provide a driver and a vehicle with useful information by using a wireless communication network.

An audio video navigation (AVN) terminal presently embedded in a vehicle is a representative vehicular telematics terminal, and includes various telematics application programs (hereinafter, referred to as "embedded app(s)" for convenience of description) embedded during manufacturing of the AVN terminal to provide various telematics services, such as a vehicle diagnosis and a remote control, as well as a road guide service reflecting real-time traffic information.

The vehicle terminal may be interlocked with a telematics (TMS) center to provide the service, and periodical updates of the embedded apps are also managed by the TMS center.

In the meantime, as number of users of information and communication devices such as smart phones has increased, the vehicle terminals have recently been developed so that a vehicular downloaded application program (hereinafter, referred to as "downloaded app(s)" for convenience of description) may be installed in the vehicle terminal through a download app center, such as a general smart phone or a tablet PC in accordance with demands of the users.

Accordingly, function of the vehicle terminal has been enhanced so as to provide various information with the downloaded app, as well as the embedded app, through the TMS center.

However, in a case where the telematics embedded apps and the downloaded apps are simultaneously installed in the vehicle terminal, and an app capable of interlocking with the TMS center among the downloaded apps is installed, when the TMS center transmits a service request message to the vehicle terminal, the vehicle terminal may not recognize whether the service request message is a message for the telematics embedded app or a message for the downloaded app. This can lead to a problem in that all of the apps are operated. For example, in a case where a message for a specific app is received from the TMS center, all of the embedded apps and the downloaded apps are driven, so that there is a problem in that all of the TMS messages need to be analyzed.

The above information disclosed in this Background section is only for enhancement of understanding of the background and therefore it may contain information that does not form the prior art that is already known to a person of ordinary skill in the art.

SUMMARY

An aspect of the present disclosure provides system and method for providing a vehicular telematics service capable of processing a service by performing message processing, which differentiates a vehicular embedded telematics app from a downloaded app, when providing a telematics service in which a vehicle terminal, a TMS center, and a user terminal are interlocked with one another.

An exemplary embodiment of the present application provides a system for providing a vehicular telematics service. The system including a vehicle terminal, in which an embedded application and a downloaded application are installed for receiving a telematics service, and which includes a telematics unit for transceiving data for the telematics service through a wireless communication network. The system also includes a telematics center which applies sending information and reception information about a service target application to header information of a service request message when receiving a service request from a user terminal, and transmits the service request message to the vehicle terminal, in which when the vehicle terminal receives the service request message, the vehicle terminal drives the embedded application or the downloaded application by referring to the reception information applied to the header information.

The embedded application may be an app embedded in the vehicle terminal when the vehicle is released, or an application program distributed through the telematics center, and the downloaded application may be an application program distributed through a download app center and separately installed.

The telematics unit may include a wireless communication module configured to communicate with the telematics center through the wireless communication network, and a vehicle communication gateway configured to process data transceived with the telematics center.

The telematics center may include an embedded telematics service unit configured to provide the telematics service for the embedded application of the vehicle terminal. The telematics center may also include a downloaded app service unit configured to provide the telematics service for the downloaded application of the vehicle terminal. The telematics center may further include a center communication unit configured to transceive data with the vehicle terminal through the wireless communication network, and relay various data for an interlocking service between the vehicle terminal and the user terminal.

Moreover, when the telematics center receives a service processing result for the service request message from the vehicle terminal, the telematics center may reply the service processing result to the user terminal.

The telematics center may apply the sending information and information about the embedded application as reception information to header information of a transmitted message for updating the embedded application, and transmit the transmitted message to the vehicle terminal.

Another exemplary embodiment of the present application provides a method of providing a vehicular telematics service by a telematics center interlocking with a user terminal and a vehicle terminal. The method includes a) receiving a request for a service from the user terminal. The method also includes b) determining whether a target of the requested service is an embedded application or a downloaded application installed in the vehicle terminal. The method also includes, c) when the target of the requested services is the embedded application, applying sending information about the telematics center and reception information including the information about the embedded application to header information of a service request message, and transmitting the service request message to the vehicle terminal. The method also includes, d) when a service result message according to processing of the requested service is received from the vehicle terminal, transmitting the service result message to the user terminal.

Further, operation c) may include, when the target of the requested service is the downloaded application, applying sending information of the telematics center and reception information including information about the downloaded application to the header information of the service request message, and transmitting the service request message to the vehicle terminal.

Further, operation d) may include analyzing the header information of the received service result message, confirming the vehicle terminal, which is the sending information, and the information about the embedded application or the downloaded application, and storing a service history for the confirmed application of the vehicle terminal.

Yet another exemplary embodiment of the present application provides a method of providing a vehicular telematics service by a vehicle terminal interlocking with a telematics center, in which an embedded application and a downloaded application for receiving a telematics service are installed. The method includes a) receiving a service request message generated by the telematics center. The method further includes b) analyzing only header information of the service request message, and determining sending information of the telematics center and whether a target of the requested service is the installed embedded application or downloaded application. The method also includes c) when the target of the requested service is the embedded application, driving the installed embedded application and processing the service in order to receive the telematics service. The method also includes d) generating a service result message according to the service processing result, and transmitting the generated service result message to the telematics center.

Further, operation d) may include applying sending information of the vehicle terminal and reception information, to which the information about the embedded application is input, to header information of the service result message.

Further, operation c) may include, when the target of the requested service is the downloaded application, driving the installed downloaded application and processing the service in order to receive the telematics service.

Further, operation d) may include applying sending information of the vehicle terminal and reception information, to which the information about the downloaded application is input, to header information of the service result message.

According to the exemplary embodiments of the present application, the vehicle terminal may confirm only the reception information (target system) included in the header information of the message, and drive the confirmed target app or transmit only the message without the need to analyze the entire reception messages of the TMS center, thereby improving performance and a merchantable quality of the vehicle terminal and the downloaded app.

Further, it is possible to smoothly provide various telematics services by using a downloaded app received from a general download app center, as well as an embedded app, by using the vehicle terminal, thereby improving user satisfaction.

DETAILED DESCRIPTION OF THE EMBODIMENTS

Figure 1:
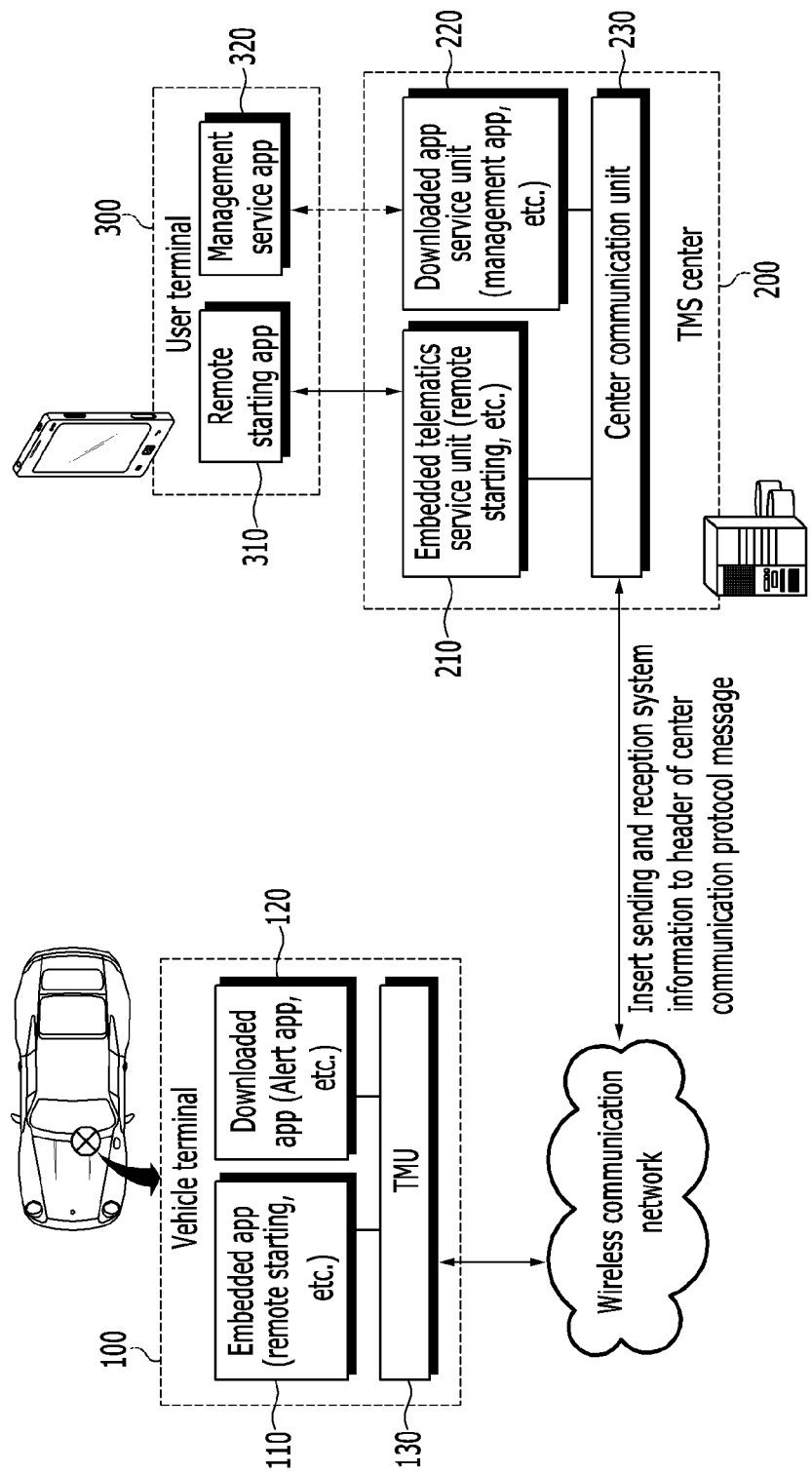
FIG. 1 is a configuration diagram schematically illustrating a system for providing a vehicular telematics service according to an exemplary embodiment of the present application.

In the following detailed description, only certain exemplary embodiments of the present application have been shown and described, simply by way of illustration. As those skilled in the art would realize, the described embodiments may be modified in various different ways, all without departing from the spirit or scope of the present application. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising", will be understood to imply the inclusion of stated elements but not the exclusion of any other elements. In addition, the terms "-er", "-or" and "module" described in the specification mean units for processing at least one function and operation and can be implemented by hardware components or software components and combinations thereof.

Throughout the specification, the term "first" or "second" may be used for describing various constituent elements, but the constituent elements shall not be limited by the above terms. The terms may be used only for the purpose of discriminating one constituent element from another constituent element, for example, a first constituent element may be called a second constituent element, and similarly, a second constituent element may be called a first constituent element without departing from the scope of the concept of the present application.

Hereinafter, a system and a method of providing a vehicular telematics service according to an exemplary embodiment of the present application will be described in detail with reference to the accompanying drawings.

FIG. 1 is a configuration diagram schematically illustrating a system for providing a vehicular telematics service according to an exemplary embodiment of the present application.

Referring to FIG. 1, the system for providing a vehicular telematics service according to the exemplary embodiment of the present application includes a vehicle terminal 100, a telematics center (hereinafter, referred to as a "TMS center") 200, and a user terminal 300.

An embedded app 110 and a downloaded app 120 for receiving a telematics service are installed in the vehicle terminal 100, and the vehicle terminal 100 includes a telematics unit (TMU) 130 for transceiving data for the telematics service through a wireless communication network.

The embedded app 110 is an app embedded in the vehicle terminal 100 when a vehicle is released, or an application program distributed through the TMS center 200, and provides various vehicle-related information interlocked with the TMS center 200, such as remote starting of the vehicle, remote diagnosis and management, and real-time traffic information.

The downloaded app 120 is an application program distributed through a general download app center, and may provide a service based on the embedded app 110 and to this end, the downloaded app 120 may be connected with the TMS center 200 to transceive data.

The TMU 130 includes a wireless communication module (not illustrated) for communicating with the TMS center 200 through a wireless communication network, such as a mobile communication network (3G/4G/4.5G) or a wireless LAN (WiFi), and a vehicle communication gateway (not illustrated) for processing data transceived with the TMS center 200.

When the TMU 130 receives a service request message from the TMS center 200, the TMU 130 analyzes header information of the message, and confirms sending information (From) and application reception information (To, information about the embedded app or the downloaded app). Further, the TMU 130 transmits the service request message to the corresponding embedded app 110 or downloaded app 120 according to a result of the confirmation.

That is, in this case, the sending information (From) confirmed in the header information may be the TMS center, and the application reception information (To) may be the embedded app 110 or the downloaded app 120 installed in the vehicle terminal 100, and may transmit the service request message to the related app according to the result of the confirmation.

Further, the TMU 130 may load the sending information (From, user terminal identification information or vehicle identification information) and the application reception information (To) on terminal transmission message protocol header information about the message transmitted to the TMS center 200 and transmit the message.

The TMS center 200 includes an embedded telematics service unit 210, a downloaded app service unit 220, and a center communication unit 230.

The embedded telematics service unit 210 is a system for providing a telematics service to the embedded app of the vehicle terminal 100, and generates a related message when a request is made from the user terminal 300, or a center itself needs to transmit data for a separate telematics service.

The downloaded app service unit 220 is a system for providing a telematics service to the downloaded app of the vehicle terminal 100, and generates a related message when a request is made from the user terminal 300, or a center itself needs to transmit data for a separate telematics service.

The center communication unit 230 is a communication gateway transceiving data with the vehicle terminal 100 through the wireless communication network, and may relay various data for interlocking service between the vehicle terminal 100 and the user terminal 300.

Particularly, when the center communication unit 230 receives a message according to a service request from the user terminal 300, the center communication unit 230 confirms whether a service requesting target is the embedded app or the downloaded app, and generates a service request message including the confirmed target app as reception information.

That is, the center communication unit 230 may insert sending information (From, the TMS center) and target application reception information (To, the embedded app information or the downloaded app information) into header information of the generated service request message and transmit the service request message to the vehicle terminal 100.

Further, the center communication unit 230 may transmit a service result message replied from the vehicle terminal 100 after the service request.

In the above description, the reception information (To) included in the header information of the message transceived by the vehicle terminal 100 and the center communication 230 is information for discriminating a target app, and is different from general destination address information about a communication message.

Accordingly, although omitted in the previous description, each message may separately include destination address information about the vehicle terminal 100 or the TMS center 200.

In the meantime, a method of providing a vehicular telematics service according to an exemplary embodiment of the present application based on the configuration of the aforementioned system for providing the vehicular telematics service will be described with reference to FIGS. 2 and 3.

[First Exemplary Embodiment]

Figure 2:
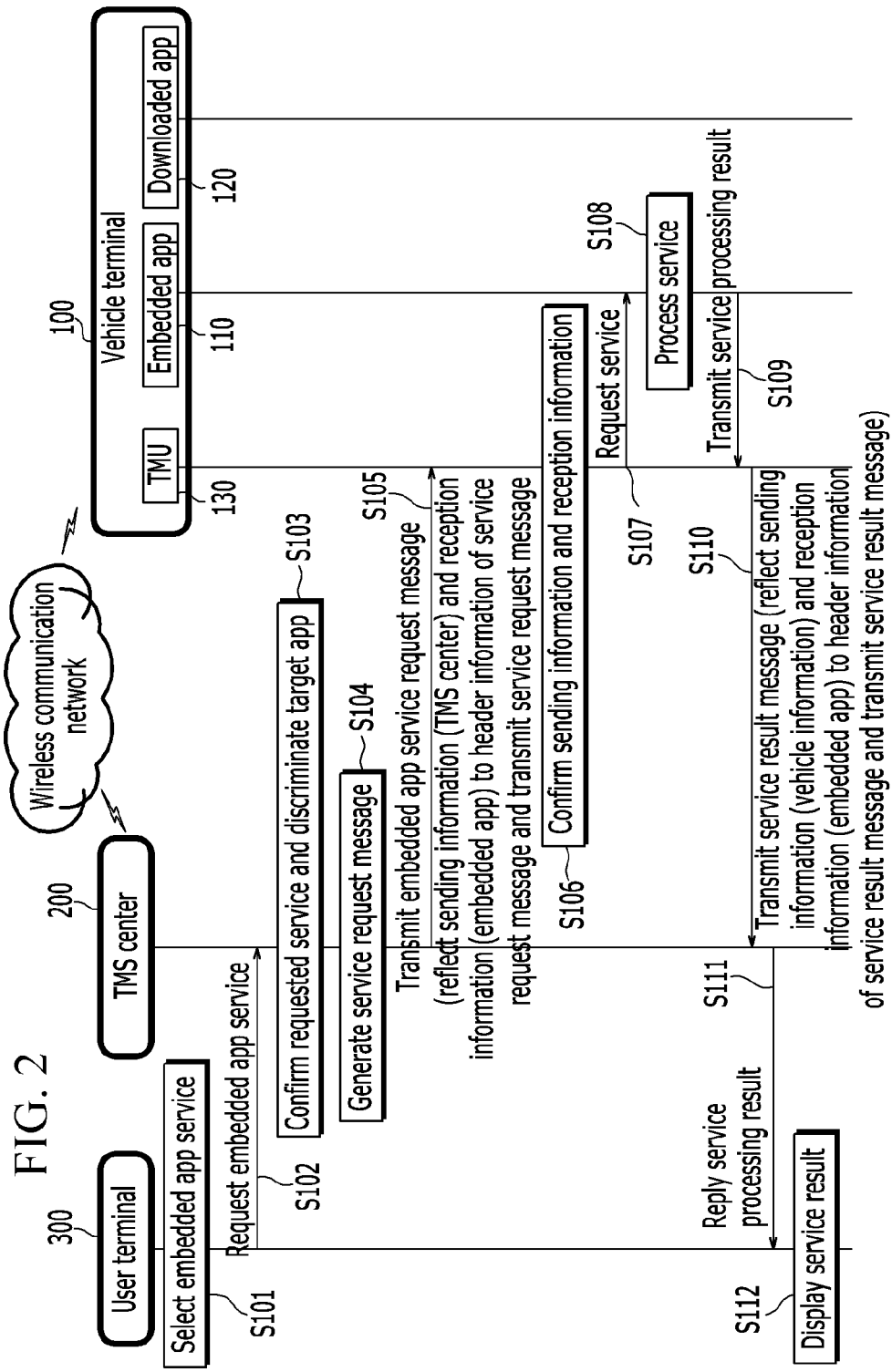
FIG. 2 is a flowchart illustrating a method of providing a vehicular telematics service by using an embedded app according to a first exemplary embodiment of the present application.

FIG. 2 is a flowchart illustrating a method of providing a vehicular telematics service by using an embedded app according to a first exemplary embodiment of the present application.

Referring to the accompanying FIG. 2, a driver according to the first exemplary embodiment of the present application selects an embedded app service by using the user terminal 300 (S101), and makes a request for a service to the TMS center 200 (S102).

Hereinafter, it is assumed that the service requested is a vehicle remote starting service for convenience of the description.

When the TMS center 200 receives the request for the service from the user terminal 300, the TMS center 200 analyzes the corresponding requested service, and confirms that the requested service is a remote starting service by using the embedded app of the vehicle (S103).

The TMS center 200 generates a service request message for the vehicle remote starting (S104), and reflects sending information and reception information subjected for the embedded app to header information of the generated service request message and transmits the service request message to the vehicle terminal 100 through the wireless communication network (S105). The TMS center 200 may transmit an embedded app service request message in which sending information (From, the TMS center) and reception information (To, the embedded app) are reflected to the header information of the embedded app service request message.

When the vehicle terminal 100 receives the embedded app service request message from the TMS center 200, the vehicle terminal 100 analyzes the embedded app service request message, drives the embedded app 110, processes the vehicle remote starting service, and transmits a successful result of the starting to the TMS center 200 (S106 to S110).

The process will be described in more detail. When the TMU 130 receives the embedded app service request message from the TMS center 200, the TMU 130 analyzes the header information of the embedded app service request message, and confirms the sending information and the reception information (S106). Then, the TMU 130 makes a request for the service to the embedded app 110 confirmed from the reception information (S107).

The embedded app 110 processes the service according to the vehicle remote starting service request (S108), and transmits a service result to the TMU 130 (S109).

The TMU 130 generates a service result message, and transmits the generated service result message to the TMS center 200 through the wireless communication network (S110). In this case, sending information (From, the user terminal/vehicle information) and reception information (To, the embedded app) may be loaded on header information of the service result message as described above and the service result message may be transmitted.

When the TMS center 200 receives the service result message from the vehicle terminal 100, the TMS center 200 replies the corresponding service result to the user terminal 300 (S111).

In this case, the TMS center 200 may analyze the header information of the received service result message and confirm the vehicle terminal that is the transmission information, confirm the embedded app or downloaded app information from the reception information, and store a telematics service use history of the vehicle terminal 100 or the user terminal 300 for the confirmed application.

In this case, the stored use history may be utilized as data for confirming whether the telematics service of the vehicle terminal 100 is successful, a remote control state, update state information, and service use details.

Then, the user terminal 300 displays the replied service result on a screen so as for the user to confirm the replied service result (S112).

[Second Exemplary Embodiment]

In the meantime, a method of providing a vehicular telematics service according to a second exemplary embodiment of the present application is similar to that of the first exemplary embodiment except for provision of the telematics service by using a downloaded app, thereby being briefly described.

Figure 3:
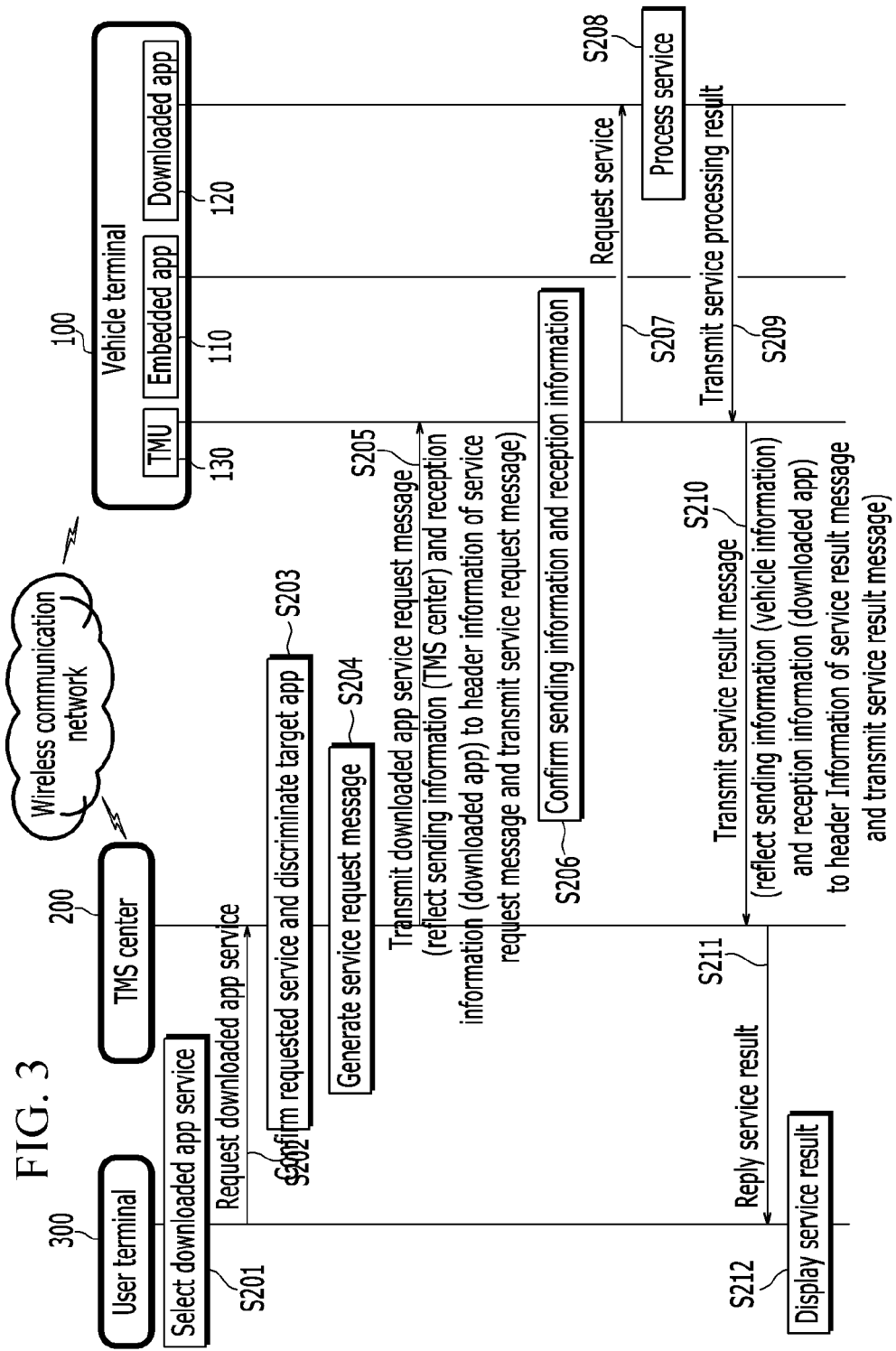
FIG. 3 is a flowchart illustrating a method of providing a vehicular telematics service by using a downloaded app according to a second exemplary embodiment of the present application.

FIG. 3 is a flowchart illustrating a method of providing a vehicular telematics service by using a downloaded app according to the second exemplary embodiment of the present application.

Referring to the accompanying FIG. 3, a driver according to the second exemplary embodiment of the present application selects a downloaded app service by using the user terminal 300 (S201), and makes a request for a service to the TMS center 200 (S202).

The TMS center 200 analyzes the request for the service received from the user terminal 300, and confirms that the service requested is a service using a downloaded app of the vehicle (S203).

The TMS center 200 generates a service request message for driving the downloaded app (S104), and reflects sending information and reception information subjected to the downloaded app to header information of the generated service request message and transmits the service request message to the vehicle terminal 100 (S205).

When the TMU 130 receives the downloaded app service request message from the TMS center 200, the TMU 130 analyzes the received downloaded app service request message and confirms the sending information and the reception information (S206). Then, the TMU 130 makes a request for the service to the corresponding downloaded app 120 confirmed from the reception information (S207).

The downloaded app 120 processes the service according to the request for the service (S208), and transmits a service result to the TMU 130 (S209).

The TMU 130 generates a service result message, and transmits the generated service result message to the TMS center 200 through the wireless communication network (S210). In this case, sending information (From, the user terminal/vehicle information) and reception information (To, the downloaded app) may be loaded on header information of the service result message and the service result message may be transmitted.

When the TMS center 200 receives the service result message from the vehicle terminal 100, the TMS center 200 replies the corresponding service result to the user terminal 300 (S211).

Then, the user terminal 300 displays the replied service result on a screen so as for the user to confirm the replied service result (S212).

As described above, according to the exemplary embodiments of the present application, the vehicle terminal may confirm only the reception information (target system) included in the header information of the message, and drive the confirmed target app or transmit only the message without the need to analyze the entire reception messages of the TMS center, thereby improving performance and a merchantable quality of the vehicle terminal and the downloaded app.

Further, the present application may smoothly provide various telematics services by using a downloaded app received from a general download app center, as well as an embedded app, by using the vehicle terminal, thereby improving user satisfaction.

While the exemplary embodiments have been described, the present application is not limited to the exemplary embodiments, and may be variously modified.

For example, in the aforementioned exemplary embodiments of the present application, the telematics service in which the user terminal 300, the TMS center 200, and the vehicle terminal 100 are interlocked, has been mainly described, but the telematics service is not limited thereto, and various types of telematics services may be provided.

For example, the TMS center 200 may be interlocked with the vehicle terminal 100 in an operation state of the vehicle to update a program by discriminating the embedded app from the downloaded app, and a technology of reflecting sending and reception information to a header of a communication protocol message according to the exemplary embodiment of the present application is applied to communication between a download app center and the vehicle terminal 100 as a standard, thereby advantageously increasing a utilization range of the telematics service.

The exemplary embodiment of the present application is not implemented only by the aforementioned apparatus and/or method, and may be implemented through a program for executing a function corresponding to the configuration of the exemplary embodiment of the present application, a recording medium in which the program is recorded, and the like, and such an implementation may be easily realized by those skilled in the art from the description of the aforementioned exemplary embodiment.

While this application has been described in connection with what is presently considered to be practical exemplary embodiments, it is to be understood that the application is not limited to the disclosed embodiments, but, on the contrary, is intended to cover various modifications and equivalent arrangements included within the spirit and scope of the appended claims.

DESCRIPTION OF SYMBOLS

100: Vehicle terminal
110: Embedded application (embedded app)
120: Downloaded application (Downloaded app)
130: Telematics unit (TMU)
200: Telematics center (TMS center)
210: Embedded telematics service unit
220: Downloaded app service unit
230: Center communication unit
300: User terminal
310: Remote starting app
320: Management service app

What is claimed is:

1. A system for providing a vehicular telematics service, comprising:
   a vehicle terminal, in which an embedded application and a downloaded application are installed for receiving a telematics service, and which includes a telematics unit for transceiving data for the telematics service through a wireless communication network; and
   a telematics center which applies sending information and reception information about a service target application to header information of a service request message when receiving a service request from a user terminal, and to transmit the service request message to the vehicle terminal,
   wherein when the vehicle terminal receives the service request message, the vehicle terminal drives the embedded application or the downloaded application by referring to the reception information applied to the header information.

2. The system of claim 1, wherein:
   the embedded application is an app embedded in the vehicle terminal at vehicle release, or an application program distributed through the telematics center, and
   wherein the downloaded application is an application program distributed through a download app center and is separately installed.

3. The system of claim 1, the telematics center further comprising:
   an embedded telematics service unit configured to provide the telematics service for the embedded application of the vehicle terminal;
   a downloaded app service unit configured to provide the telematics service for the downloaded application of the vehicle terminal; and
   a center communication unit configured to transceive data with the vehicle terminal through the wireless communication network, and relay various data for an interlocking service between the vehicle terminal and the user terminal.

4. The system of claim 3, wherein:
   when the telematics center receives a service processing result for the service request message from the vehicle terminal, the telematics center replies the service processing result to the user terminal.

5. The system of claim 1, wherein:
   when the telematics center receives a service processing result for the service request message from the vehicle terminal, the telematics center replies the service processing result to the user terminal.

6. The system of claim 1, wherein:
   the telematics center
   applies the sending information and information about the embedded application as reception information to header information of a transmitted message for updating the embedded application, and to transmit the transmitted message to the vehicle terminal.

7. A method of providing a vehicular telematics service by a telematics center interlocking with a user terminal and a vehicle terminal, the method comprising:
   a) receiving a request for a service from the user terminal;
   b) determining whether a target of the requested service is an embedded application or a downloaded application installed in the vehicle terminal;
   c) when the target of the requested services is the embedded application, applying sending information about the telematics center and reception information including the information about the embedded application to header information of a service request message, and transmitting the service request message to the vehicle terminal; and
   d) when a service result message according to processing of the requested service is received from the vehicle terminal, transmitting the service result message to the user terminal.

8. The method of claim 7, operation c) further comprising:
   when the target of the requested service is the downloaded application, applying sending information of the telematics center and reception information including information about the downloaded application to the header information of the service request message, and transmitting the service request message to the vehicle terminal.

9. The method of claim 8, operation d) further comprising:
   analyzing the header information of the received service result message;
   confirming the vehicle terminal, which is the sending information, and the information about the embedded application or the downloaded application; and
   storing a service history for the confirmed application of the vehicle terminal.

10. The method of claim 7, operation d) further comprising:
    analyzing the header information of the received service result message;
    confirming the vehicle terminal, which is the sending information, and the information about the embedded application or the downloaded application; and
    storing a service history for the confirmed application of the vehicle terminal.

11. A method of providing a vehicular telematics service by a vehicle terminal interlocked with a telematics center, in which an embedded application and a downloaded application for receiving a telematics service are installed, the method comprising:
    a) receiving a service request message generated by the telematics center;
    b) analyzing header information of the service request message, and determining sending information of the telematics center and whether a target of the requested service is the installed embedded application or downloaded application;
    c) when the target of the requested service is the embedded application, driving the installed embedded application and processing the service in order to receive the telematics service; and
    d) generating a service result message according to the service processing result, and transmitting the generated service result message to the telematics center.

12. The method of claim 11, wherein:
    operation d) includes
    applying sending information of the vehicle terminal and reception information, to which the information about the embedded application is input, to header information of the service result message.

13. The method of claim 11, wherein:
    operation c) includes
    when the target of the requested service is the downloaded application, driving the installed downloaded application and processing the service in order to receive the telematics service.

14. The method of claim 13, wherein:
    operation d) includes
    applying sending information of the vehicle terminal and reception information, to which the information about the downloaded application is input, to header information of the service result message.

* * * * *